No. 898,161. PATENTED SEPT. 8, 1908.
W. H. WILDER.
BUNCHING DEVICE FOR HARVESTERS.
APPLICATION FILED DEC. 10, 1907.
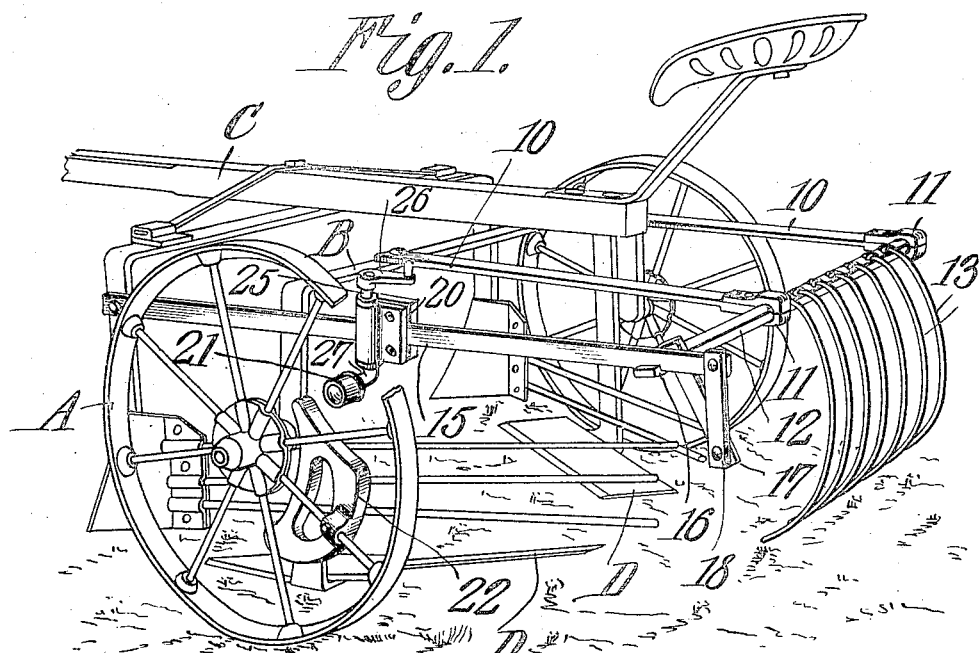
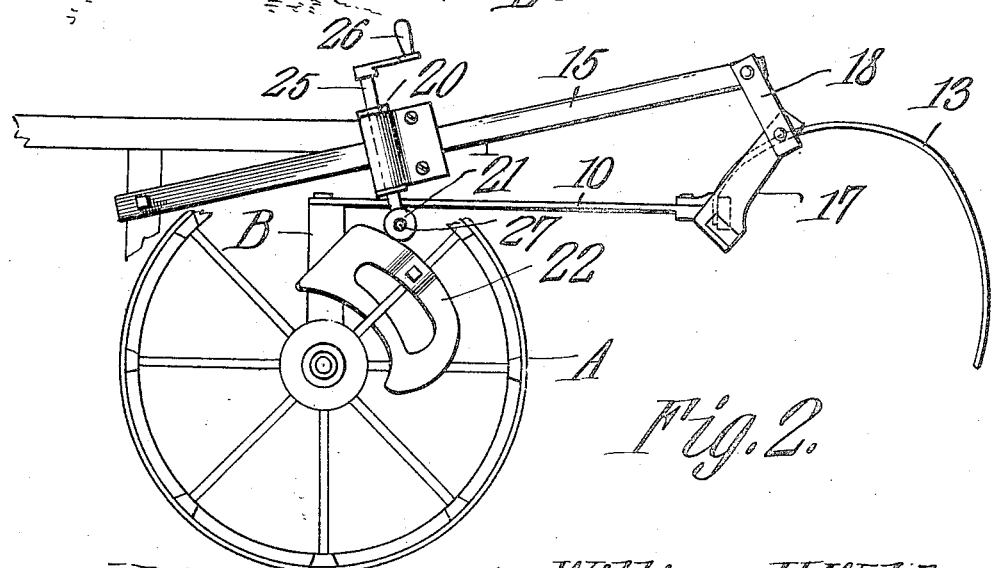
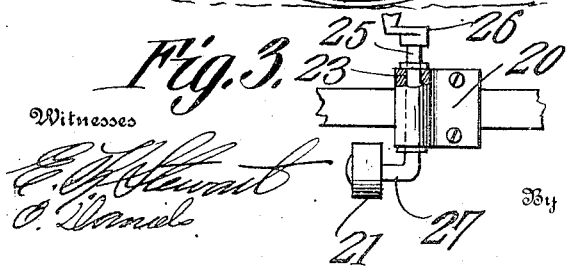
William H. Wilder,
Inventor

UNITED STATES PATENT OFFICE.

WILLIAM HENRY WILDER, OF CALEDONIA, NEW YORK.

BUNCHING DEVICE FOR HARVESTERS.

No. 898,161.

Specification of Letters Patent.

Patented Sept. 8, 1908.

Application filed December 10, 1907. Serial No. 405,909.

*To all whom it may concern:*

Be it known that I, WILLIAM HENRY WILDER, a citizen of the United States, residing at Caledonia, in the county of Livingston and State of New York, have invented a new and useful Bunching Device for Harvesters, of which the following is a specification.

This invention relates to harvesters of that class employed for harvesting crops of beans, peas, or the like, and has for its principal object to provide a novel form of buncher and buncher operating means, whereby the vines may be gathered together in spaced bunches or piles after the cutting operation.

A further object of the invention is to provide a bunching rake in which the rake head is pivotally mounted, so as to be free to turn on its axis to clear a bunch of vines which have been gathered together.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:— Figure 1 is a perspective view of a bean harvester provided with a bunching device constructed in accordance with the invention. Fig. 2 is a side elevation of a portion of the same. Fig. 3 is a detail view of the bracket for supporting the cam actuated roller.

Similar numerals of reference are employed to indicate corresponding parts throughout the several figures of the drawings.

The harvesting machine proper may be of the ordinary construction, and includes supporting wheels A, an arched axle B, a tongue C and cutters D.

Secured rigidly to the frame and projecting rearward therefrom, is a pair of horizontally disposed bars 10, the rear ends of which are provided with journal boxes 11 for the reception of the similar end portions of the rake head 12, the latter carrying curved tines 13 of any ordinary construction for engaging and gathering the vines into the form of a bunch. This rake head is adapted to turn on its axis in order to clear a gathered bunch, and this operation is usually accomplished once during each complete rotation of the supporting wheels A, after which the fork is again lowered into contact with the ground.

To the forward portion of the frame is pivoted the front end of a lever 15 that extends rearward and rests upon a lug or block 16 that projects from the end of the rake head 10, and near the end of the rake head is secured a crank arm 17 that is connected to the rear end of the lever by a link 18. The lever 15 is arranged close to the inner face of one of the wheels A and secured to said lever is a hanger 20 carrying an anti-friction roller 21 that is arranged to be engaged by a cam 22 on the wheel A, and at each rotation of the wheel, this cam will engage the anti-friction roller and will swing the lever 15 upward. This movement is transmitted from the rear end of the lever to the crank arm 17 through the medium of the link 18, and the rake head is turned on its axis for the purpose of moving the tines upward out of engagement with a gathered bunch of vines. As the cam 22 moves from engagement with the anti-friction roller 21, the lever 15 descends by gravity until its rear end comes into contact with the stop block 16. This block limits the downward movement of the lever, and at the same time limits the descent of the tines 13, so that the latter will not swing too far forward, nor come too close into contact with the ground.

The bracket or hanger 20 is provided with a vertical opening 23 for the passage of a spindle 25 having at its upper end a handled crank 26. At the lower end of the spindle is an outwardly extending arm 27 on which the roller 21 is journaled, so that by turning the crank through an arc of 90° the roller may be moved to a position out of the path of movement of the cam and the buncher will not be operated.

I claim:—

1. In a bean harvester, a frame including a pair of rearwardly extending bars or arms, a transversely extending rake head pivotally mounted therein and provided with depending tines, a crank arm secured to the rake head, a pivotally mounted operating lever connected to the crank arm, and a cam carried by one of the supporting wheels of the harvester and arranged to actuate said lever.

2. In a bean harvester, a frame including a pair of rearwardly extending bars provided with journal boxes at their rear ends, a rake head pivotally mounted in such journal boxes and provided with depending tines, a lever having its forward end pivoted to the frame, a block extending from the rake head and serving as a support for limiting the downward movement of the rear end of the lever a crank arm secured to the rake head, a link connecting the crank arm to the lever, a bracket secured to the lever, and a cam carried by one of the supporting wheels and arranged to engage said bracket.

3. In a bean harvester, a rake head, a rake head actuating lever, a bracket mounted thereon, a spindle carried by the bracket and having an outwardly extending arm, a roller journaled on the arm, a cam carried by one of the supporting wheels and arranged to engage said roller, and a handled crank carried by the upper end of the spindle for turning the roller to a position out of the path of movement of said cam.

In testimony that I claim the foregoing as my own, I have hereto affixed my signature in the presence of two witnesses.

WILLIAM HENRY WILDER.

Witnesses:
   CHAS. A. PLACE,
   EDW. L. PLACE.